United States Patent [19]

Loudet et al.

[11] Patent Number: 5,520,511
[45] Date of Patent: May 28, 1996

[54] TURBOMACHINE VANE WITH VARIABLE CAMBER

[75] Inventors: Claude Loudet, Maincy; Jean-Paul Mirete, Moissy Cramayel, both of France

[73] Assignee: Societe Nationale d'Etude et de Construction de Moteurs d'Aviation "SNECMA", Paris, France

[21] Appl. No.: 361,586

[22] Filed: Dec. 22, 1994

[30] Foreign Application Priority Data

Dec. 22, 1993 [FR] France ................................ 93 15393

[51] Int. Cl.⁶ .................................................. F04D 15/00
[52] U.S. Cl. ............................................ 415/148; 415/161
[58] Field of Search ................................. 415/148, 161

[56] References Cited

U.S. PATENT DOCUMENTS

| | | |
|---|---|---|
| 3,442,493 | 5/1969 | Smith, Jr. .................. 415/161 |
| 3,723,021 | 3/1973 | Batholomew . |
| 4,009,571 | 3/1977 | Black et al. .................. 415/161 |
| 4,856,962 | 8/1989 | McDow . |
| 4,995,786 | 2/1991 | Wheeler . |
| 5,207,558 | 5/1993 | Hagle et al. .................. 415/148 |

FOREIGN PATENT DOCUMENTS

| | | |
|---|---|---|
| 274293 | 7/1988 | European Pat. Off. . |
| 0274293A1 | 7/1988 | European Pat. Off. . |
| 2325831 | 9/1976 | France . |
| 2321582 | 4/1973 | Germany . |
| 2416724 | 4/1974 | Germany .................. 415/161 |
| 0223194A1 | 5/1987 | Germany . |
| 4212880A1 | 4/1992 | Germany . |

*Primary Examiner*—John T. Kwon
*Attorney, Agent, or Firm*—Oblon, Spivak, McClelland, Maier & Neustadt

[57] ABSTRACT

A variable camber turbomachine vane is described in which at least one of a front part and a rear part is pivotable relative to the other about a pivot axis to vary the camber of the vane, and the facing end surfaces of the front and rear parts form a junction which provides for the continuity of the intrados and extrados faces of the vane as well as for sealing between these two faces. The pivot axis is offset on the intrados face side relative to the mean surface of the vane by a distance which is preferably at least one third of the thickness of the vane. Also, a cover is provided on the intrados side of the vane for masking the recess which is created in the intrados face at the junction when the camber of the vane is varied.

18 Claims, 5 Drawing Sheets

TURBOMACHINE VANE WITH VARIABLE CAMBER

BACKGROUND OF THE INVENTION

1. Field of the Invention

The invention relates to variable camber vanes as used in turbomachines, especially aircraft turbo-engines.

2. Summary of the Prior Art

To improve the performance of a turbomachine which can operate at different speeds, it is known to modify the pitch of certain vanes depending on the turbomachine speed.

A vane comprises a leading edge and a trailing edge joined together by two flanks termed the intrados face and the extrados face. The intrados face is generally concave and is inclined towards the upstream region of the fluid flow, while the extrados face is convex and is inclined towards the downstream region of the fluid flow. The fluid exerts a greater pressure on the intrados face than it does on the extrados face. The term "mean surface" is applied to the notional surface extending from the leading edge to the trailing edge mid-way between the intrados face and the extrados face. In more advanced machines, the camber of certain vanes may also be varied depending on the turbomachine speed. This type of vane usually has a front part and a rear part which are mutually pivotally connected, and the junction between the front part and the rear part provides both for the continuity of the intrados face and the extrados face, as well for the sealing between these two faces. The junction is defined by a concave surface on one of the parts and having the shape of a portion of a surface of revolution about the geometric axis of the pivotal connection, and a convex surface on the other part positioned closely to the concave surface, one of these two surfaces being movable angularly relative to the other around the pivot axis. This axis is generally situated in close proximity to the mean surface.

The closeness of the concave and convex surfaces of the junction ensures the seal between the intrados face and the extrados face. When the camber of the vane is increased, the convex surface of the junction is no longer fully covered by the concave surface, and contributes to the continuity of the extrados face.

Variable camber vanes are known having a fixed leading edge and a movable trailing edge, European Patent 0274293 disclosing an example of such a vane in the form of an air intake guide vane in which the leading edge also forms a radial arm providing a connection between the air intake casing of an aircraft turbo-engine and its hub.

Variable camber vanes are also known in which the leading edge pivots and the trailing edge is fixed, such as described in French patent 2325831.

Furthermore, variable camber vanes are known in which the leading and trailing edges both pivot, such as disclosed in U.S. Pat. No. 4,995,786.

In these three types of vane, the improvement in performance obtained by setting the camber of the vane in the best way possible is impaired by the disturbances caused in the flow of fluid along the lateral faces of the vane and in the region of the pivotal connection. These disturbances are caused both by the space left at the level of the pivotal connection between the leading edge part and the trailing edge part, and by the discontinuity of the extrados face of the vane at the level of the pivotal connection, that is to say by the sudden change of direction of the tangent to this face in the direction of fluid flow.

This sudden change of direction is particularly troublesome on the extrados face, as it produces a very localized overspeed at the level of the pivotal connection, as well as random separations of the fluid flow which create abnormal mechanical stresses on the vanes and losses in the performance of the turbomachine.

German Patent 42.12880 proposes a hinged vane in which the thickness of the front part is considerably increased relative to that of the rear part, the front part thus surrounding the pivotal connection much more. This solution improves the continuity of the extrados face when the camber of the vane is adjusted to the maximum, but the performance of the vane is impaired in all other configurations. This is due to the over-thickness of the front part of the vane, as well as to the simultaneous break in the continuity of the intrados face and the extrados face at the pivotal connection.

Generally therefore, the improvement in performance of a turbomachine made possible over wider operational ranges by the possibility of varying the camber of certain vanes is partly lost as a result of the impairment of the aerodynamic performance of the vane.

SUMMARY OF THE INVENTION

The invention aims to reduce the impairment of the performance of a variable camber vane while remaining as close as possible to the ideal profile of the vane in its minimum camber setting, and to this end the invention proposes offsetting the pivot axis of the vane in a direction towards the intrados face relative to the mean surface of the vane, in the vicinity of which this axis is usually situated. This amounts to increasing overall the radius of curvature of the concave and convex surfaces forming the junction between the front and rear parts of the vane, as well as slanting these surfaces relative to the mean surface. The surfaces of the junction will thus quickly extend away from the intrados face and will become progressively tangential to the extrados face with a greater radius of curvature.

The extent of the offset should be at least equal to ¼ of the thickness of the vane for the result sought to become noticeable, but preferably the offset should be equal to or greater than ⅓ of the vane thickness for a better result.

Since the concave and convex surfaces of the junction are no longer tangential to the intrados face, a recess will be formed in the intrados face in the region of the junction, i.e. adjacent the exposed portion of the concave end surface, when the camber of the vane is greater than its minimum setting. So as not to impair the flow of fluid along the intrados face, it is preferably to mask this recess by a cover which provides continuity for the intrados face. Preferably this cover will be rigidly connected at one end to the part of the vane having the concave junction surface, while the other end of the cover remains free. In practice, it is the front part of the vane which has the concave junction surface, and which, consequently, will support the cover. The outer surface of the cover may thus form an extension of the surface of the front part which constitutes part of the intrados face of the vane.

In a preferred embodiment, the junction surface of the rear part of the vane is convex and has a first portion with a radius of curvature close to that of the concave junction surface in the vicinity of the intrados face, thus ensuring a seal between the intrados face and the extrados face. In addition, the convex end surface has a second portion which leads into the extrados face portion of the rear part of the vane and which has a radius of curvature which progressively increases towards that of the extrados face portion so as to merge smoothly therewith, thereby ensuring the continuity of the extrados face when the camber setting of the vane is greater than its minimum.

The invention provides a substantial improvement in the performance of the vane in highly cambered settings, without there being any particular impairment of the performance in the minimum camber setting. In addition, the invention makes it possible to increase by about 10° the maximum camber of the vane without increasing the impairment of its performance, which enables the successfully useful range of the turbomachine to be extended.

A vane in accordance with the invention may be used wherever it is already possible to use a conventional hinged vane.

BRIEF DESCRIPTION OF THE DRAWINGS

FIG. 2 is a magnified view of the pivot junction between the front and rear parts of the vane shown in FIG. 1;

DESCRIPTION OF THE PREFERRED EMBODIMENTS

Figure 1:
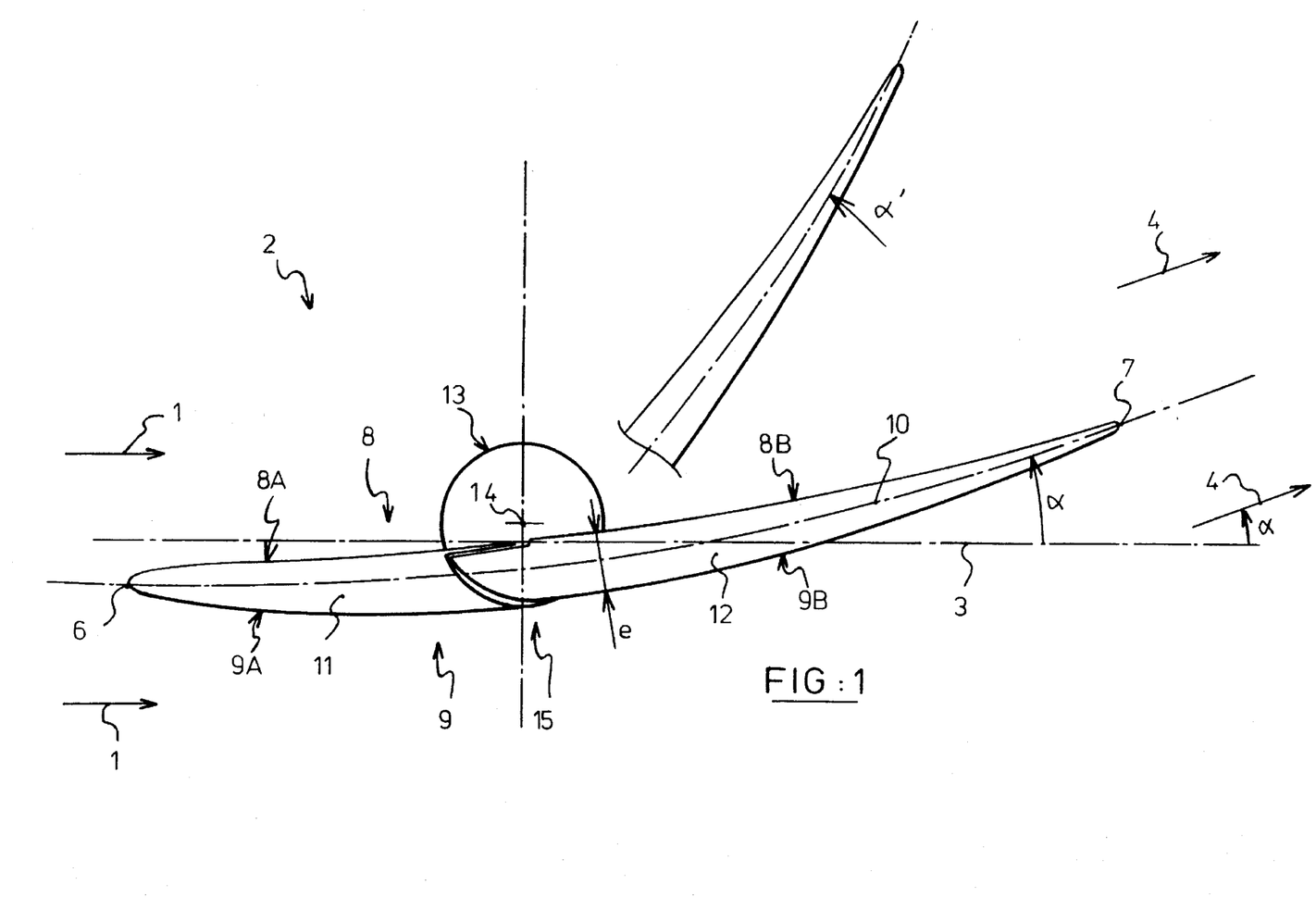
FIG. 1 is a transverse sectional view of one embodiment of a vane in accordance with the invention.

With reference to FIG. 1, the direction of the fluid flow incident on the front part of the vane 2 during operation is indicated by the arrows 1 and is parallel to the geometric axis 3. The flow is then deflected as a consequence of the inclination of the vane at the angle α relative to the axis 3, and the direction of the fluid flow at the rear of the vane 2 after deflection by the vane is indicated by the arrows 4 at an angle α relative to the axis 3.

Usually, the end 6 at the front of the vane is termed the leading edge, the end 7 at the rear of the vane is termed the trailing edge, the lateral surface 8 between the leading edge 6 and the trailing edge 7 on the deflection side of the vane is termed the intrados face, and the lateral surface 9 situated on the opposite side of the vane is termed the extrados face. Moving from the leading edge 6 to the trailing edge 7, the distance between the intrados face 8 and the extrados face 9 increases at first, passes through a maximum e commonly termed the "thickness" of the vane, and then decreases towards the trailing edge 7. Ideally the vane would be infinitely thin and reduced to a mean surface 10 which extends from the leading edge 6 to the trailing edge 7 and which defines both the intrados face 8 and the extrados face 9. In practice, however, the vane 2 has a thickness so as to achieve the desired mechanical strength, and the mean surface 10 is equidistant between the intrados face 8 and the extrados face 9.

In the present embodiment, the front part 11 of the vane 2 is fixed whereas its rear part 12 is rigidly connected to a pivotable platform 13 which pivots around an axis 14, this axis 14 thus constituting a geometric pivot axis for the rear part 12. By pivoting around the axis 14, the inclination of the rear part 12 can vary between a minimum angle α and a maximum angle α'.

The intrados face 8 has a portion 8A on the front part 11 of the vane and a portion 8B on the rear part, and the extrados face 9 has a portion 9A on the front part 11 and a portion 9B on the rear part 12.

Usually, the intrados face 8 is at an overpressure during operation and the extrados face 9 is under partial vacuum. To prevent leakage of fluid from the intrados face 8 towards the extrados face 9 between the front part 11 and the rear part 12, the vane 2 has a fluid-tight arrangement at the junction 15 between its forward part 11 and its rear part 12. The junction 15 also ensures, within certain limits, the continuity of the profiles of the intrados and extrados faces.

Referring now to FIG. 2, it will be seen that, in accordance with the invention, the pivot axis 14 is not on the mean surface 10 of the vane as is usually the case, but is offset relative thereto in the direction of the intrados face 8 by a distance d which, in the drawing figure, is greater than half the thickness of the vane.

At the junction 15 the end surface of the front part 11 facing the rear part 12 is a concave surface 16 which has the shape of a portion of a surface of revolution centered on the pivot axis 14, this surface 16 meeting the intrados face portion 8A along a line 17 and meeting the extrados face portion 9A along a line 18. The end surface of the rear part 12 facing the front part 11 is a convex surface 19 which meets the intrados face portion 8B along a line 20 and meets the extrados face portion 9B along a line 21. When the rear part 12 pivots around the axis 14, the convex surface 19 moves inside the concave surface 16, leaving a clearance 22 between these surfaces 16 and 19. The surface 19 is formed by first and second connected portions 19A and 19B. The portion 19A extends from the line 20 as far as a line 23 close to the line 20 and approximately parallel to it, and has the shape of part of a surface of revolution about the axis 14 close to the surface 16 so that the clearance 22 between the surface 19A and the surface 16 is minimal in order to provide the sealing between the intrados face 8 and the extrados face 9. The surface portion 19B extends from the line 23 to the line 21, and has a curvature which increases evenly from the line 23 where it has a radius equal to the radius of curvature of the surface 19A, to the line 21 where it has a radius equal to the radius of curvature of the extrados face portion 9B.

When the vane 2 is in its minimum camber setting, that is to say the angle of inclination at its minimum, a part of the surface portion 19B projects beyond the surface 16 and ensures satisfactory continuity of the extrados face 9 in the region of the junction 15, more precisely between the lines 18 and 21 respectively bounding the extrados face portions 9A and 9B.

When the camber of the vane 2 is increased, the projecting part of the surface portion 19B becomes greater and thus serves as a connection between the face portions 9A and 9B which are even more inclined with respect to each other. The camber of the vane may be increased still further while maintaining satisfactory sealing until the line 23 comes opposite the line 18. An even greater increase of the camber is possible, but at the expense of impairing the fluid-tightness between the intrados face 8 and the extrados face 9.

When the vane 2 is set at a camber greater than the minimum angle α, a recess 25 appears in the intrados face 8 at the junction 15. This recess could be detrimental to the regularity of the flow of fluid along the intrados face 8. To remedy this, the recess 25 is arranged to be masked by a cover 26 having a thin and flattened shape. The cover 26 has an outer surface 27 which is flush with the intrados face portions 8A and 8B, at least in the minimum camber setting of the vane, and an inner surface 28 which is preferably plane and opposite the surface 27. The cover 26 is securely fixed at one end to the front part 11 of the vane so that its outer surface 27 effectively extends the face 8A of the front part 11, whereas the opposite end 29 of the cover is free.

So as to house the cover 26 within the volume of the vane 2, the rear part 12 has a rebate in its intrados face portion 8B starting from the line 20 at the forward end of the rear part 12, the rebate having a depth which is at least equal to the thickness of the cover 26 and being defined by a surface 30 facing the inner surface 28 of the cover 26 and having a shape complementary to the surface 28. The surface 30 extends around the free end 29 of the cover 26 and merges with the intrados face portion 8B along a line 32, a portion of a fictitious surface of revolution 31 about the axis 14 being disposed between the free end 29 and the surface 30 and tangented by the surface 30.

It will be noted that the cover 26 is firmly secured to the front part 11 of the vane, which is the part having the concave surface 16 of the junction 15. This arrangement is preferable in the case where the vane is mounted where the flow of fluid may include suspended particles, as it prevents these particles entering the recess 25 and the clearance 22 under the inertia of the flow. With a reverse arrangement, that is to say with a cover 26 and a concave surface 16 provided on the rear part 12, the particles would enter the recess 25 and the clearance 22, with the danger of clogging them and jamming the vane.

When the vane 2 is in its minimum camber setting, that is to say the inclination of the rear part 12 is at its minimum value, the surfaces 8A, 27 and 8B forming the intrados face 8 and also the surfaces 9A, 19B (in part) and 9B forming the extrados face 9 merge to define faces 8 and 9 which are close to the optimum that the vane 2 would have if it were not hinged, the ends of the spaces 22 and 25 having only a negligible influence on the flow of fluid.

On the other hand, when the vane 2 is in its maximum camber setting, that is to say the inclination α of the rear part 12 is at its maximum, the line 23 is very close to the line 18 and the extrados face 9 formed by the surfaces 9A, 19B (complete) and 9B has a curvature which evolves continuously and without a break from the front towards the rear of the vane 2, thus allowing a very good flow of the fluid. On the intrados face 8 side, the recess 25 is substantial, but is masked by the cover 26 and therefore has no effect on the flow of fluid.

Figure 3:
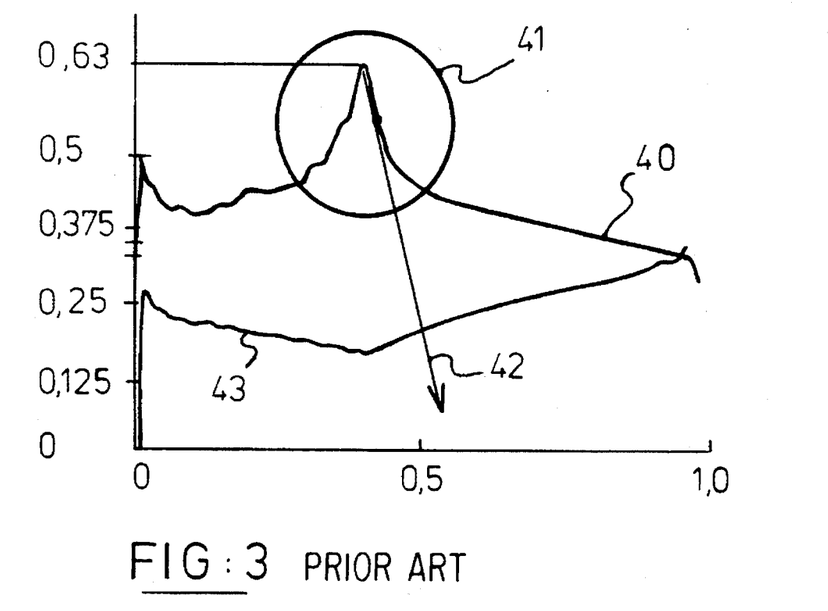
FIG. 3 is a diagram illustrating the speeds of the fluid flows along the intrados face and the extrados face of a conventionally hinged variable camber vane at the surface of the boundary layer, the diagram being prepared using the well known Navier-Stokes numerical method.

The flow speed diagram shown in FIG. 3 relates to a conventional vane cambered to 30° and the offset d of which is nil, that is to say the geometric pivot axis 14 is on the mean surface 10. The abscissa represents, in relative coordinates, the position on the vane between the leading edge 6 and the trailing edge 7, and the ordinate represents the mach speed of the flow of air, that is to say the speed relative to the speed of sound. The upper curve 40 traces the flow speed of the air along the extrados face 9. Moving along the abscissa from value 0 to value 1, which traces the travel along the vane between the leading edge 6 and the trailing edge 7, the speed, which is initially approximately mach 0.5, passes through a minimum at the extrados face portion 9A, has an overspeed zone (indicated by the circle 41) corresponding to the flow of air over the junction 15, then decreases evenly along the extrados face portion 9B until it reaches a value of approximately mach 0.325 at the trailing edge. Within the circled critical zone 41 the overspeed reaches mach 0.63 and then decreases suddenly with a negative gradient 42 of about −4.1. This overspeed and negative gradient occur at the pivotal connection where the convex curvature of the extrados face is substantial, which disturbs the flow of air and causes separations.

Figure 4:
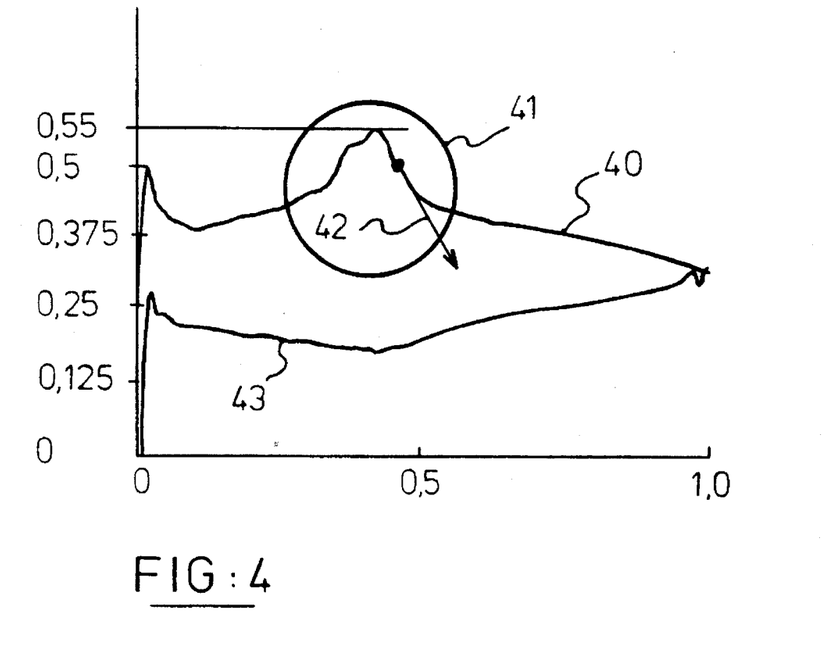
FIG. 4 is a diagram similar to that of FIG. 3 but for a vane in accordance with the invention.

Referring now to FIG. 4 which shows the corresponding flow speed diagram for a vane in accordance with the invention, the curve 40 tracing the speed of the air flowing along the extrados face 9 is very similar to that in FIG. 3, except in the overspeed zone surrounded by the circle 41 where the maximum speed is only mach 0.55 instead of mach 0.63 and the negative gradient is −1.3 instead of −4.1, thus regularizing the air flow.

It will be noted that the lower curve 43 which traces the air speed along the intrados face 8 is practically the same in FIG. 3 and in FIG. 4, which shows that the substantial improvement in the air flow along the extrados face 9 as a result of increasing the radius of curvature at the pivotal connection does not bring about any correlative impairment at the intrados face 8.

Figure 5:
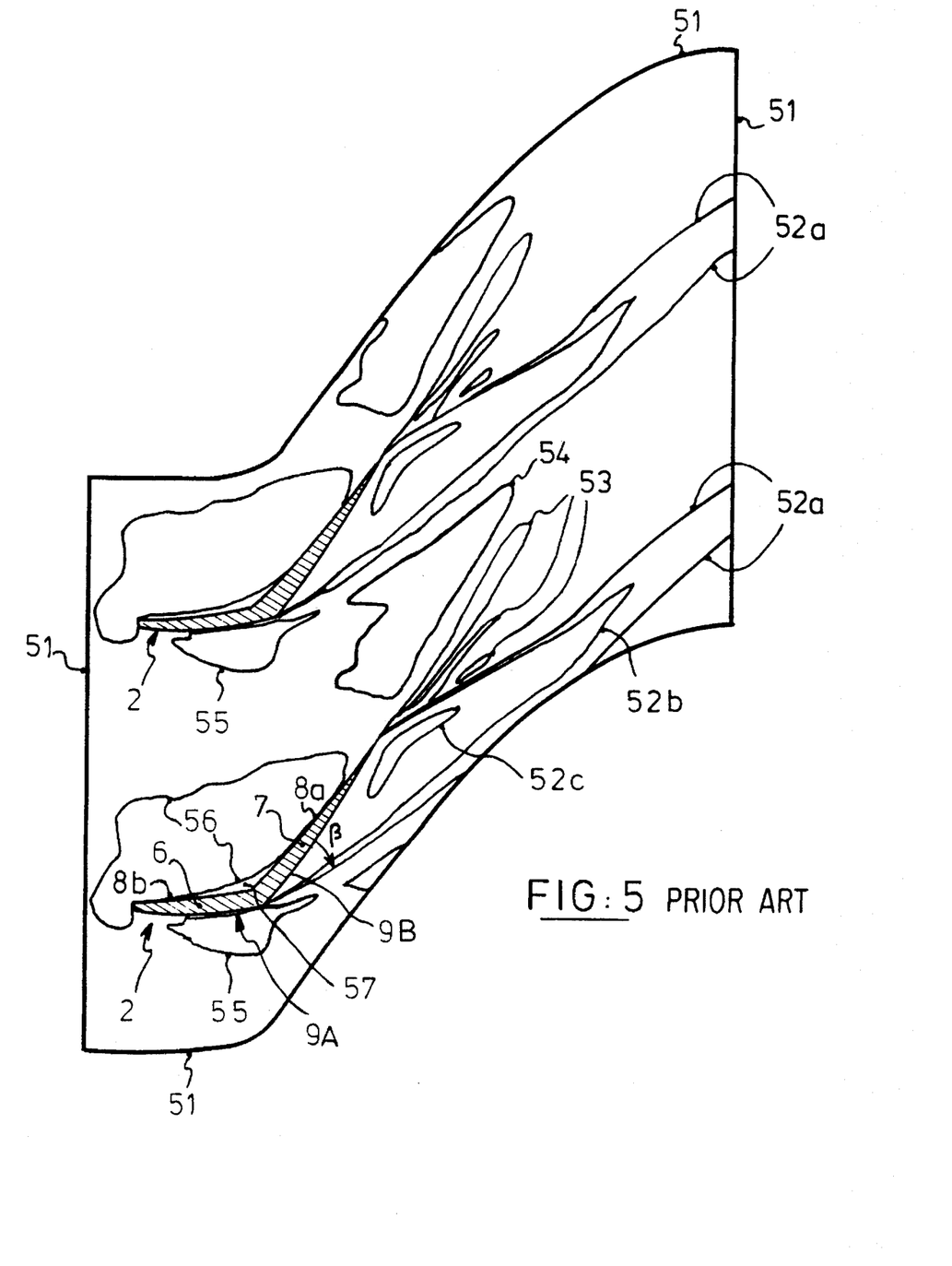
FIG. 5 is a diagram illustrating the speeds of the fluid flows in a fluid flow path including conventionally hinged variable camber vanes, the speeds being represented visually by isentropic isomach curves prepared using the Navier-Stokes method.
Figure 6:
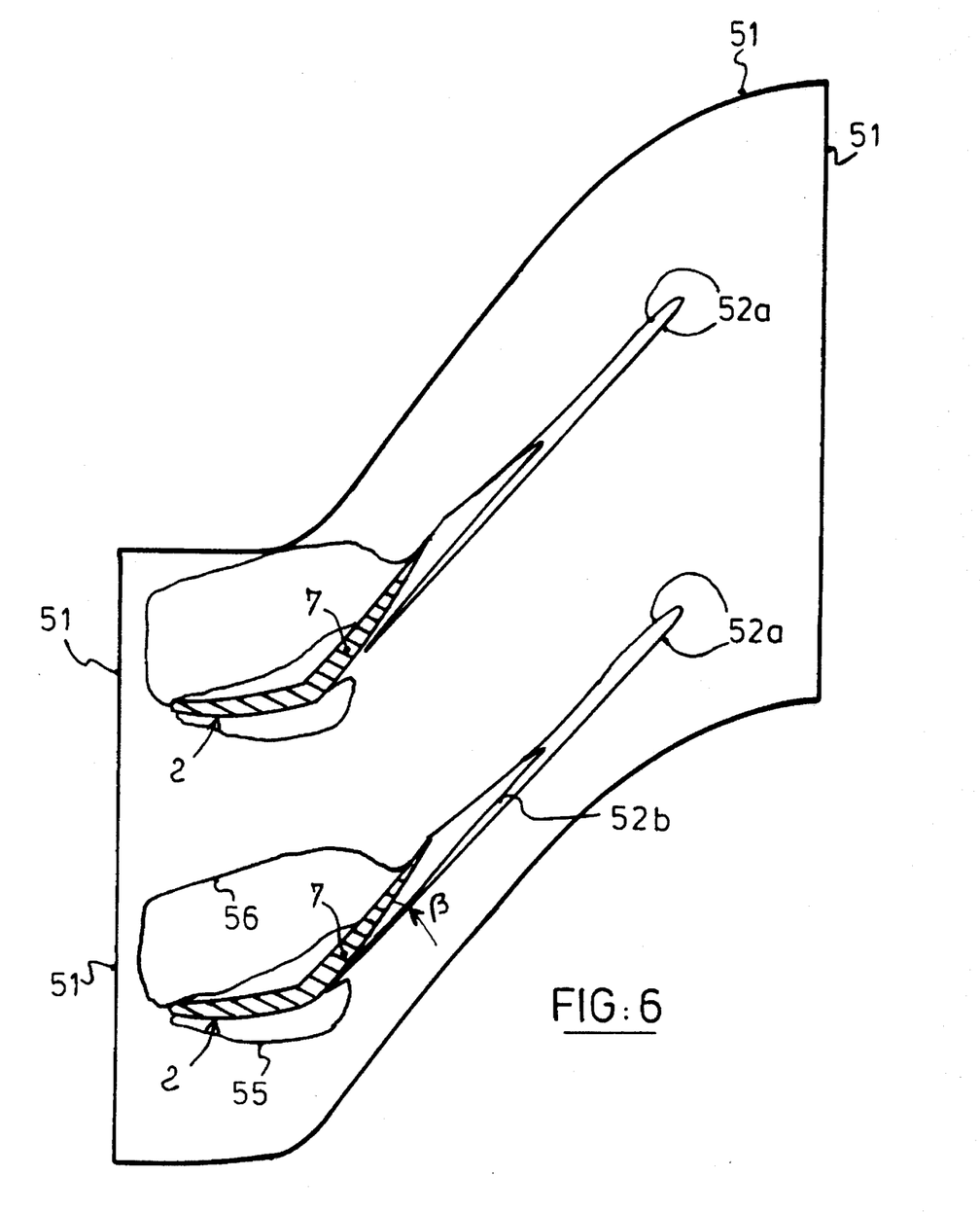
FIG. 6 is a diagram similar to that of FIG. 5, but for vanes in accordance with the invention.

The advantage of the invention will become even more evident on comparing FIGS. 5 and 6 which represent the flow of fluid in a fluid flow path containing conventional variable camber vanes and variable camber vanes in accordance with the invention, respectively.

In FIG. 5 the flow is depicted around two vanes 2 in a field defined by the perimeter 51. Each vane 2 is of a conventional type in which the trailing edge part 7 is pivoted without offset on the leading edge part 6, the camber setting being 40°, the vane thickness e being 11 mm, and the radius of the surface 16, not shown here, being 5.5 mm.

The isomach 52a defines a zone with reduced fluid speed, this zone starting from the extrados face portion 9B of the trailing edge part 7 and extending far to the rear of the vane, the reduction being even more substantial within isomach 52b and especially isomach 52c. The fluid flow therefore no longer takes place except in the remaining section of the flow path, that is to say outside the isomach curve 52a. The flow of moving fluid thus separates from the vane at an angle β formed by the extrados face 9B of the trailing edge part 7 and the isomach 52a meeting the said face 9B.

The isomach 53 downstream of the trailing edges 7, and the isomach 54 half way between the trailing edges 7 of the two adjacent vanes 2 and downstream of the said trailing edges, define disturbed flow zones.

Thus, almost the whole of the flow path is obstructed by the zones defined by isomachs 52a, 53 and 54. The conventional hinged vane is therefore hardly usable at such a camber setting.

Isomach 55 represents an overspeed zone on the extrados face portion 9A of the leading edge part 6, and isomach 56 defines a zone of intermediate speed on the intrados face side of the vane. The zone 57 between isomach 56 and the intrados face portions 8A, 8B of the leading and trailing edge parts 6 and 7 is an underspeed zone reflecting the separation of the fluid flow at that point.

FIG. 6 shows a similar diagram for vanes in accordance with the invention having the same inclination of the trailing edge part 7 and an offset d of the pivot axis equal to 54% of the thickness e of the vane, the radius of the concave surface 16 being 11.5 mm.

A first important result obtained is that isomach 52a now defines a very small and narrow zone which is much better aligned on the trailing edge 7, the separation angle β having returned to a few degrees. In addition, the isomachs referenced 53 and 54 in FIG. 5 have disappeared. The cross-section of the fluid flow path in which the flow of fluid takes place normally, i.e. outside the isomach 52a, now corresponds to almost the full cross-section of the flow path. The isomachs 55 and 56 have not changed significantly, taking into account the accuracy of the Navier-Stokes model, which shows that the improvement of the above performance has not led to significant impairment elsewhere.

In conclusion, the comparison of FIGS. 5 and 6 highlights two advantages of the invention:

1) decidedly improved fluid flow; and,
2) widening of the range of operation of the vane so that excellent fluid flow is achieved even at high camber settings.

It will be noted that these curves are of significance only when mutually compared, as their absolute values are completely dependent on the geometry of the vanes and on the operational conditions of the turbomachine.

The embodiment which has been described is given by way of non-limitative example, and it will be understood that the invention allows a diversity of designs for the vane without departing from its scope.

The vane 2 has an optimum profile when the intrados face and extrados face portions 8B and 9B of the rear part 12 respectively extend the lines of the intrados and extrados face portions 8A and 9A of the front part 11. This optimum profile may be given to the vane 2 in its minimum camber setting, in an intermediate camber setting, or if really necessary in its maximum camber setting, depending on need. The position of the surface 30 facing the cover 26, as well as the clearance 22 and the line 18, are determined to accommodate the minimum camber, that is to say so that there should not be any interference between the rear part 12, the front part 11 and the cover 26. The vane may have a single pivot defining the axis 14, or two pivots at opposite ends of the vane as in the European patent 0274293 mentioned earlier.

It is generally the front part 11 of the vane that is fixed and the rear part 12 that is movable, but it is also possible, depending on need, to have a movable front part 11 and a fixed rear part 12, or for both parts 11 and 12 to be movable. The fixed part may be used as a structural part of the turbomachine, as in the above-mentioned European patent 0274293.

We claim:

1. A variable camber turbomachine vane defining an intrados face, an extrados face, a maximum thickness between said intrados and extrados faces, and a notional mean surface substantially equi-distant from said intrados and extrados faces, said vane comprising a front part and a rear part, and means defining a pivot axis about which at least one of said front and rear parts is pivotable relative to the other to vary the camber of said vane, said front and rear parts having respective end surfaces which face each other and define a junction between said front and rear parts, one of said end surfaces being concave and having the shape of a portion of a surface of revolution about said pivot axis, and said pivot axis being offset from said mean surface on the same side thereof as said intrados face by a distance which is not less than one third of said maximum thickness of said vane.

2. A variable camber turbomachine vane according to claim 1, wherein said concave end surface is on said front part of said vane.

3. A variable camber turbomachine vane according to claim 2, including a cover over said junction between said front and rear parts on said intrados face side of said vane, said cover masking the recess which is created in said intrados face at said junction when the camber of said vane is greater than its minimum value.

4. A variable camber turbomachine vane according to claim 3, wherein said cover has a forward end which is rigidly connected to said front part of said vane, and a rearward end which is free.

5. A variable camber turbomachine vane according to claim 4, wherein said cover has an outer surface forming an extension of the surface of said front part which constitutes part of the intrados face of said vane.

6. A variable camber turbomachine vane according to claim 1, wherein said front part of said vane is fixed and said rear part is pivotable about said pivot axis to vary the camber of said vane.

7. A variable camber turbomachine vane defining an intrados face, an extrados face, a maximum thickness between said intrados and extrados faces, and a notional mean surface substantially equi-distant from said intrados and extrados faces, said vane comprising a front part and a rear part, and means defining a pivot axis about which at least one of said front and rear parts is pivotable relative to the other to vary the camber of said vane, said front and rear parts having a respective end surfaces which face each other and define a junction between said front and rear parts, one of said end surfaces being concave and having the shape of a portion of a surface of revolution about said pivot axis, and said pivot axis being offset from said mean surface on the same side thereof as said intrados face by a distance which is not less than one third of said maximum thickness of said vane, wherein said concave end surface is on said front part of said vane, and wherein said end surface of said rear part is convex and has a first portion with a radius of curvature corresponding to that of said concave end surface of said front part, and a second portion with a progressively increasing radius of curvature such that said second portion merges smoothly into the surface of said rear part constituting part of said extrados face of said vane.

8. A variable camber turbomachine vane having an intrados face, an extrados face, and a notional mean surface substantially equi-distant from said intrados and extrados faces, comprising:

a front part having an end surface;

a rear part having an end surface which faces said end surface of said front part, with said end surface of said front part and said end surface of said rear part defining a junction between said front and rear parts;

wherein one of said front and rear parts is pivotable relative to the other of said front and rear parts about a pivot axis which is offset from said mean surface by a distance of at least one third of a maximum thickness of said vane; and wherein one of said end surface of said front part and said end surface of said rear part comprises a concave end surface having a shape which is a portion of a surface of revolution about an axis of revolution, and wherein said axis of revolution is offset from said mean surface by a distance of at least one third of the maximum thickness of said vane.

9. A variable camber turbomachine vane as recited in claim 8, wherein said one of said front part and said rear part which includes said concave end surface further includes a cover which extends over said junction, and wherein the other of said front part and said rear part pivots between first and second positions, and wherein in the first position a surface of said other of said front part and said rear part is adjacent to said cover, and further wherein during movement from said first position toward said second position said surface moves away from said cover.

10. A variable camber turbomachine vane as recited in claim 9, wherein said surface which moves away from said cover during movement from said first position toward said second position comprises a recessed surface which is recessed from said intrados face by a distance equal to a thickness of said cover.

11. A variable camber turbomachine vane as recited in claim 10, wherein said concave end surface is disposed on said front part.

12. A variable camber turbomachine vane as recited in claim 11, wherein said axis of revolution coincides with said pivot axis.

13. A variable camber turbomachine vane as recited in claim 11, wherein said end surface of said rear part comprises a convex surface portion having a surface of revolution about said axis of revolution which is offset from said mean surface by a distance of at least one third of the maximum thickness of said vane.

14. A variable camber turbomachine vane as recited in claim 13, wherein said end surface of said rear part further includes an increasing radius portion having an increasing radius of curvature extending from said convex surface portion to said extrados face.

15. A variable camber turbomachine vane as recited in claim 8, wherein said concave end surface is disposed on said front part and said end surface of said rear part comprises a convex surface portion having a surface of revolution about said axis of revolution which is offset from said mean surface by a distance of at least one third of the maximum thickness.

16. A variable camber turbomachine vane as recited in claim 15, wherein said end surface of said rear part further includes an increasing radius portion having an increasing radius of curvature extending from said convex surface portion to said extrados face.

17. A variable camber turbomachine vane as recited in claim 15, wherein said front part includes a cover which extends over said junction on an intrados side of said vane, and wherein said rear part includes a recess portion which is recessed from the intrados face by a distance equal to a thickness of said cover.

18. A variable camber turbomachine vane as recited in claim 8, wherein said one of said front and rear parts having the concave end surface has a length at an intrados side of said concave end surface which is less than a length at an extrados side of said concave end surface.

* * * * *